July 17, 1951 O. L. MacSORLEY 2,560,968

VARIABLE FREQUENCY COUNTER

Filed March 24, 1948 3 Sheets-Sheet 1

Inventor
OLIN L. MAC SORLEY

By Morris A. Rakin [signature]

Attorney

July 17, 1951 O. L. MacSORLEY 2,560,968

VARIABLE FREQUENCY COUNTER

Filed March 24, 1948 3 Sheets-Sheet 2

INVENTOR:
OLIN L. MACSORLEY
BY Morris B. Rabkin
Attorney

July 17, 1951 O. L. MacSORLEY 2,560,968

VARIABLE FREQUENCY COUNTER

Filed March 24, 1948 3 Sheets-Sheet 3

Inventor

OLIN L. MACSORLEY

By

Attorney

Patented July 17, 1951

2,560,968

UNITED STATES PATENT OFFICE 2,560,968

VARIABLE FREQUENCY COUNTER

Olin L. MacSorley, Collingswood, N. J., assignor to Radio Corporation of America, a corporation of Delaware Application March 24, 1948, Serial No. 16,835

8 Claims. (Cl. 250—27)

Figure 1:
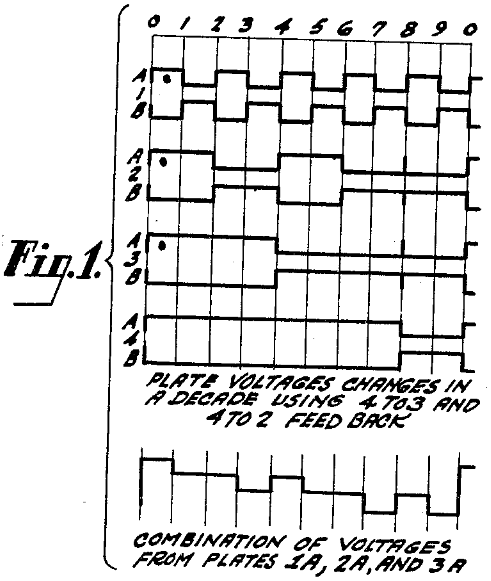

This invention relates to an improvement in variable frequency counters such as that disclosed in my copending application Ser. No. 749,849 filed May 22, 1947.

The counter of this copending application includes a plurality of tandem connected trigger circuits each including a pair of triodes which (1) have operating potential applied to their anodes through separate resistors and (2) have their anodes each connected to the grid of the other through a resistor shunted by a capacitor. With these connections, current conduction is stable in either of the anodes and is transferred from one to the other of the anodes in response to the application of an input pulse.

Successive groups, or decades, of these trigger circuits, or counter stages, are provided with count selector switches which (1) have a plurality of fixed contacts each connected to a different anode of the stages of the decade and (2) have a switch output contact which is moved to engage one or another of the cooperating fixed contacts for obtaining at the switch output contact a voltage having its maximum value in response to the attainment of the selected count.

The switch output contacts of the different counter sections or decades are so interconnected, through gate and pedestal shifting tubes, that a single output pulse is produced in response to the count selected by all the count selector switches. This single output pulse is utilized to reset the counter to its zero count condition so that the operating cycle is repeated each time the number of counter input pulses reaches the selected number.

For each decade the desired indication is obtained by connecting the plates of all of the tubes in the decade to switches in such a manner that each switch setting selects the right combination of plate voltages to give a most maximum combination voltage at the desired count. This means that additional capacity due to the wiring and switches is connected to all tubes all the time which affects the operation of the tubes, that the varying plate voltages going to the mixing tube have to go through the switch leads and switches the capacity of which interferes with the desired instantaneous change of voltage, and that the switch must be located near the decade and gate tube or else elaborate precautions must be taken to reduce the capacity between the switch leads and ground.

In the circuit previously described, a system called "pedestal shifting" is used wherein it is necessary to vary the point from which the pulse to drive the next decade is taken. To do this, the pulse obtained from each plate of the last tube in the decade must be passed through the decade switch.

In designing the herein described new system the purpose was to obtain a system that would have a minimum number of voltage combinations with no occasions when the proper action would depend upon two voltages changing in opposite directions at the same instant, and that would have all of the switching in low impedance circuits.

The fundamental change from the previous system to obtain this was as follows. Instead of always resetting the counter to a particular zero point and selecting the desired number of counts following the zero setting by varying the combination of plate voltages taken, use one particular combination of plate voltages at all times and vary the manner in which the tubes are reset according to the count wanted.

The principal object of the invention is the provision of an improved counter and method of operation whereby the undesired effect of stray capacitances is avoided. Additional objects of the invention are the provision of a counter which (1) is automatically reset to a predetermined standby condition in response to the simultaneous occurrence of voltages which do not increase to their maximum values at the same time, (2) is so connected as to maintain between the reset and output pulses of each of its decades a relation such that its operation is more positive and reliable, and (3) has the count selector switch of each of its decades or sections so operated as to select a number such that the reset pulses are always derived from the same anodes of the last two stages of such decade or section.

The invention will be better understood from the following description considered in connection with the accompanying drawings and its scope is indicated by the appended claims.

Figure 2:
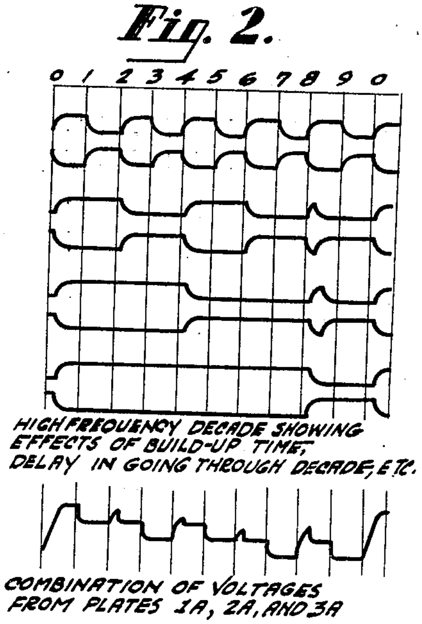
Figure 3:
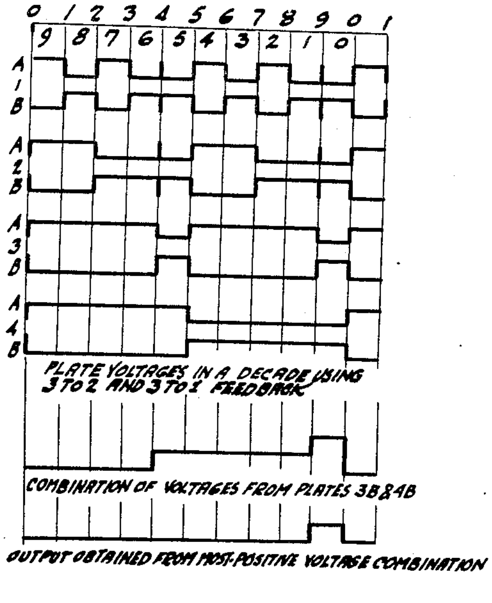
Figure 4:
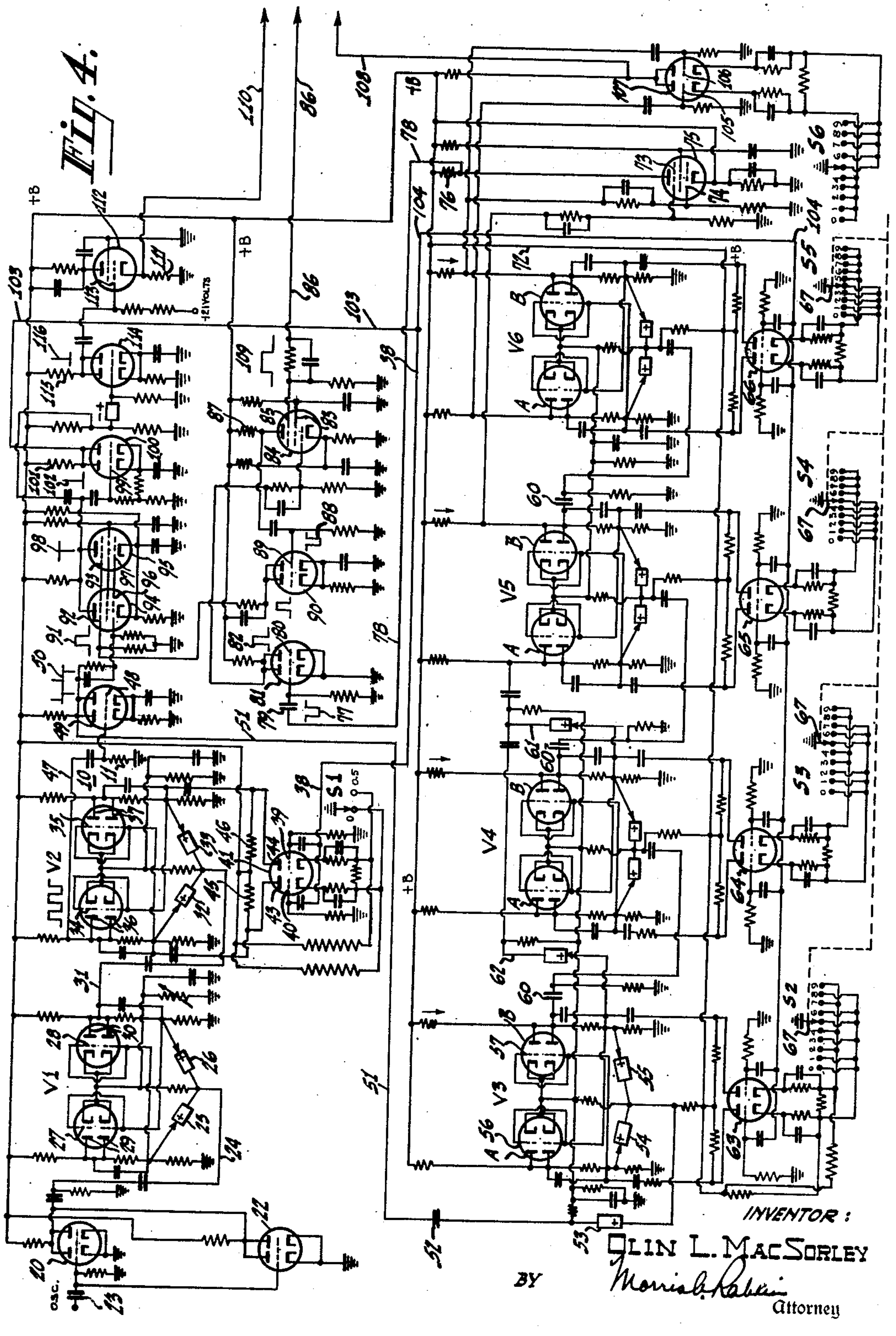
Figure 4A:
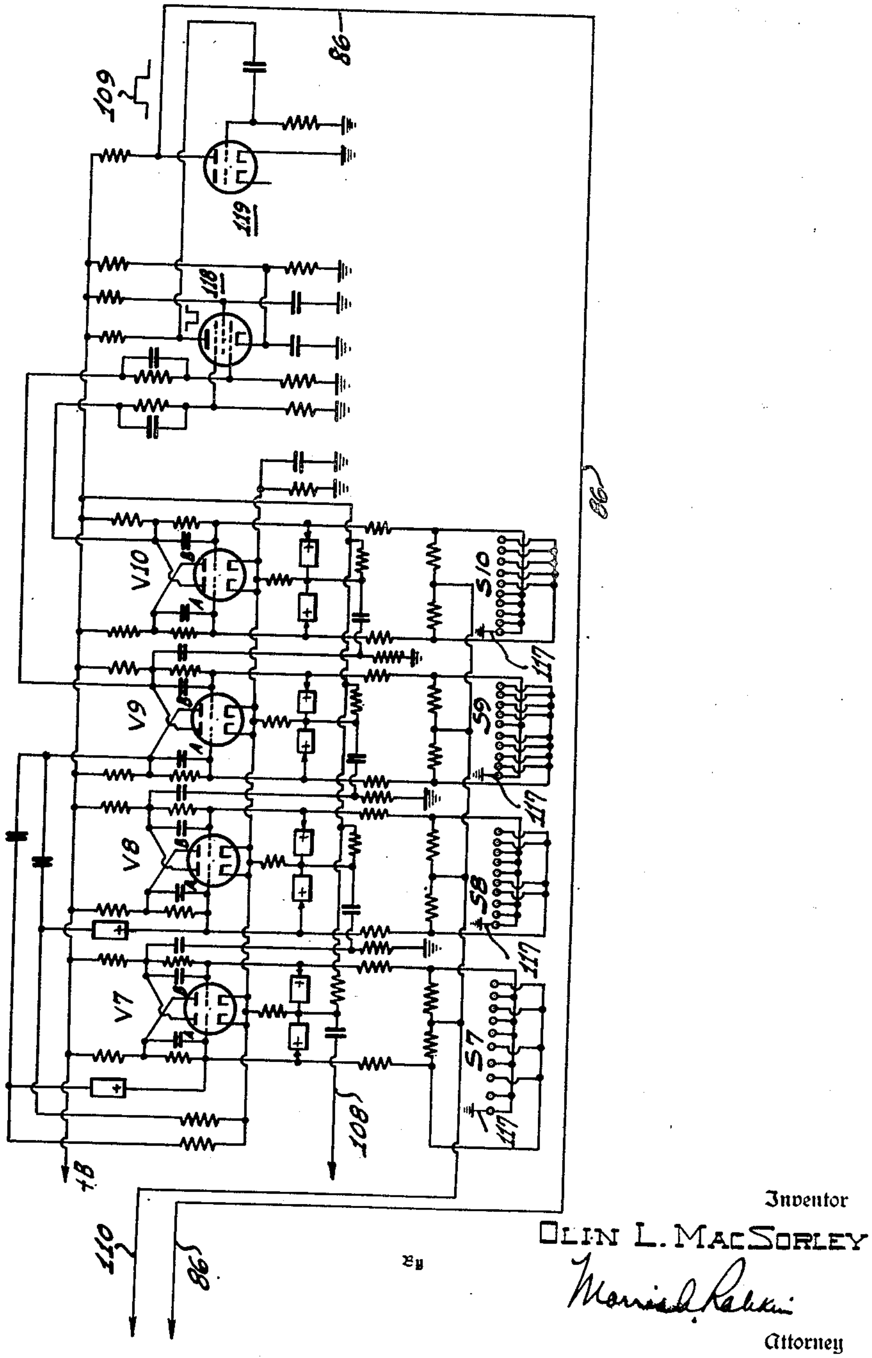

Referring to the drawings:

Figs. 1 and 2 are explanatory diagrams relating to the operation of a prior art counter such as that disclosed by my above identified copending application, Fig. 3 is an explanatory diagram relating to the operation of the counter of the present invention, and Figs. 4 and 4*a*, when placed end to end, show the connections of the counter of the present invention.

The counter of the aforesaid copending application includes decades each of which consists of four tandem connected stages having feedback connection from the fourth or highest order stage to the third and second stages. Each of these decades is provided with a count selector switch having a plurality of fixed contacts each connected to a different anode of the stages of the decade. These fixed contacts are so arranged that three output contacts of the switch may be moved to select from the fixed contacts a voltage which has its maximum value only for the particular count selected by the switch.

In Fig. 1, the voltage of the anode A of the first stage of such a decade is shown opposite the letter "A," the voltage of the anode B of the first stage is shown opposite the letter "B" and the voltages of the anodes of the other stages are similarly indicated. The counts to be selected are indicated at the top of the figure. The anode voltages selected for a count of 0 or 10 are indicated by dots. It will be noted that the three voltages selected for a count of 10 have all had their minimum value on the previous count of 9.

When three voltages are combined in this manner to give a most positive indication for only one count in ten, the avoidance of a most positive indication at some unwanted points depends upon one voltage decreasing from maximum to minimum at the same instant that some other voltage increases from minimum to maximum, or upon reset of the decade occurring quickly enough that no indication is given there. In the case of operation of the decade at a very high frequency, these voltage changes do not always happen as desired. This situation is indicated by Fig. 2 which is similar to Fig. 1 with the exception that the various voltages are shown as distorted from the square wave form of Fig. 1.

In the counter of the aforesaid application, the pedestal voltages derived from the output contacts of some of the count selector switches were shifted in phase to superimpose them on other pedestal voltages at points where such distortion does not exist. This requires that the voltage pulse obtained from each anode of the last stage in the decade be passed through the selector switch of the decade.

The counter of the present invention is so designed that (1) its operation involves a minimum number of voltage combinations with no occasion when the proper action depends on two voltages changing in opposite directions at the same instant, and (2) all its switching is done in low impedance circuits. Thus, instead of always resetting each decade of the counter to a particular zero point and selecting the desired number of counts following the zero setting by varying the combination of selected anode voltages, the complement of the desired number is set into the decade. As a result, the most favorable combination of anode voltages is always used to reset the decade to the desired count.

This method of operation is illustrated by Fig. 3 which is similar to Figs. 1 and 2 insofar as the identification of the different anode voltage of the decade are concerned. In this case, however, the feedback circuits are from the third stage to the first and second stages of the decade, the count set into the decade is indicated by the lower row of numerals at the top and the combination of the voltages at the anodes 3B and 4B of the decade are shown at the bottom of the figure. As hereinafter explained, these voltages are always utilized to reset the counter in response to a voltage which has its maximum amplitude in response to the attainment of the selected count.

Fig. 3 shows the relative voltages of all of the tubes of a decade for one complete cycle of operation. The numbers shown above the input pulses correspond to the numbering system used in the previously mentioned system wherein the combination of plate voltages was selected by means of switches to cause the most maximum voltage to occur at the desired count (Fig. 1 shows it occurring at a count of zero obtained by combining the outputs of plates 1A, 2A, and 3A for the plate voltages shown in that figure).

It will be seen that a most positive indication can be obtained at a count of nine by combining plates 3B and 4B in Fig. 3. This is a particularly nice waveshape because the two voltages do not increase to maximum at the same time, which gives a better build-up; only two voltages are combined, which gives a greater differentiation between the most-positive voltage and the next to the most positive voltage; and there are no cases where, when two voltages must change in opposite directions at the same time to avoid giving a most positive indication, the change which occurs first in time is in the positive direction, changes in the voltage at the plate of a triode being slower in the positive direction than in the negative direction for an abrupt change of grid voltage. In the system being described, this particular combination will be used at all times from each decade to obtain the pulse to actuate the reset.

Suppose now that it is desired that the decade under consideration give a most positive pulse for the third, thirteenth, twenty-third, etc. input pulse to it following reset. The reset control switch is set to the number three on the reverse scale. Then three additional pulses will bring it to the condition of most positive voltage, an additional ten pulses, or a total of thirteen, will bring it to the most positive pulse again, etc.

The next consideration is when, relative to the occurrence of the most positive pulse, the next decade should receive its actuating pulse. It must not receive its impulse between the occurrence of the reset pulse and the first following occurrence of a most maximum voltage from the decade unless the decade has been reset to the condition to give the most maximum voltage. It must not occur too close following the application of the reset pulse, otherwise some of the lower frequency decades may receive an operating pulse before they are over the effects of the reset pulse. It must not occur too close to the most positive pulse if ahead of it, otherwise the lower frequency pedestals will not have time to build up to their full values before being combined with this output pulse. All of these requirements are met if for desired counts of 5, 6, 7, 8 and 9 the next stage is actuated by the change in the fourth tube in the decade immediately following the occurrence of the most positive indication; and for desired counts of 0, 1, 2, 3, and 4 the next stage is actuated by the change in the fourth tube in the decade occurring four counts ahead of the most positive indication.

The high frequency counters are reset through tubes which are in turn driven by a vacuum tube to eliminate the time lag incident to igniting the Thyratron and resulting from the large isolating resistor between the Thyratron cathode circuit and the grid of the tube.

The lower frequecy decade is reset from a thyratron. The system shown for selecting to which grids the reset pulse should be applied is designed to avoid the necessity of passing the thyratron output pulse through a number of switches and to eliminate the necessity of switching both a hot lead and a ground for each tube to be reset. This circuit is believed to be novel.

It will be noted that all of the switching consists of the application of a ground to or the removal of a ground from a low impedance or cathode circuit. This means that the operation of the switching circuit is not critical, and the switches may be located at a reasonable distance from the circuits to be controlled. All hot circuits are permanently connected.

The wiring diagram of Figs. 4 and 4*a* includes a pulse forming circuit wherein four parallel-connected triodes 20 and 22 function in response to a sine wave voltage, applied through a capacitor 23, to produce at an output lead 24 pulses suitable for operating a trigger circuit.

The pulses of the lead 24 are applied through crystal rectifiers 25 and 26 to the grids 27 and 28 of a trigger circuit V1 which (1) is stable with current conduction in either its anodes 29 or in its anodes 30 and (2) functions to produce at its output lead 31 pulses of a frequency one half that of the pulses applied through the lead 24. This trigger circuit V1 merely functions as a frequency divider and is not a part of the counter from which different desired counts are selected by means of the selector switches hereinafter described.

The output pulses from the lead 31 are applied through the crystal rectifiers 32 and 33 to the grids 34 and 35 of a trigger circuit V2 which also is of the double stability type and has current conduction transferred from its anodes 36 to its anodes 37, or vice versa, in response to each positive pulse derived from the lead 31.

This trigger circuit V2 is arranged to be reset to either of its current conductive conditions in response to a positive pulse applied through a reset lead 38 to the grids 39 and 40 of a reset tube 41. The current conductive condition to which the trigger circuit V2 is reset is determined by the closed position of a selector switch S1.

With the switch S1 in its illustrated closed position, the grid 40 is biased to a more positive voltage than grid 39, current is drawn through a resistor 45 and the anode 43, a more negative voltage is applied to the grid 35 and current conduction is established or maintained in the anode 36. With the selector switch S1 in its other closed position, the grid 39 is biased to a more positive voltage than the grid 40, current is drawn through a resistor 46 and the anode 44, a more negative voltage is applied to the grid 34 and current conduction is established or maintained in the anode 31.

In the case of a direct reading switching system for controlling an oscillator, or other device, in half cycle steps, the switch S1 may be utilized to give the 0 and 0.5 points as indicated by the numerals adjacent its fixed contacts.

Output pulses from the trigger circuit V2 appear at a lead 47, are differentiated by means of a capacitor 10 and a resistor 11. These differentiated pulses are applied to the grid 48 of a duo-triode 49 from the anodes of which are derived pulses such as those indicated by the reference numerals 50.

The positive half-cycles of these pulses 50 are applied through a lead 51, a capacitor 52, a crystal rectifier 53 and crystal rectifiers 54 and 55 to the grids 56 and 57 of a pair of duotriodes A and B which form a part of the first stage V3 of the high frequency decade of the counter.

This decade includes stages V3 to V6 which (1) are connected in tandem by means of capacitors 60, and (2) have feedback connections 61 and 62 from the stage V5 to the stages V4 and V3. With these connections the operation of the decade V3 to V6 is as indicated by Fig. 3 wherein the stages and the anodes of the stages are indicated at the left, the voltages of the different anodes are each indicated by the curve to the right of the corresponding anode, the selected counts under the old system are indicated by the first row of numerals at the top of the figure, the numbers selected by the selector switch for the different counts is shown by the second row of numerals at the top of the figure and the potentials utilized to reset the decade are shown by the two curves at the bottom of the figure.

Expressed in the form of a tabulation, the data shown by Fig. 3 appears as follows:

| Old System Count | Present System Count | Non-Conducting Anodes | | | |
|---|---|---|---|---|---|
| | | V3 | V4 | V5 | V6 |
| 0 | 9 | A | A | A | A |
| 1 | 8 | B | A | A | A |
| 2 | 7 | A | B | A | A |
| 3 | 6 | B | B | A | A |
| 4 | 5 | A / B | A / B | B | A |
| 5 | 4 | A | A | A | B |
| 6 | 3 | B | A | A | B |
| 7 | 2 | A | B | A | B |
| 8 | 1 | B | B | A | B |
| 9 | 0 | A / B | A / B | B | B |
| 0 | 9 | A | A | A | A |

It will be noted that (1) the stage V3 has a reset tube 63 and a count selector switch S2, (2) the stage V4 has a reset tube 64 and a selector switch S3, (3) the stage V5 has a reset tube 65 and a selector switch S4 and (4) the stage V6 has a reset tube 66 and a selector switch S5.

The reset tubes 63 to 66 and the selector switches S2 to S5 are like the reset tube 41 and the selector switch S1, described above, with the exception that the selector switches S2 to S5 have ten fixed contacts while the switch S1 has only two fixed contacts. The reset tubes 63 to 66 function in response to a positive reset pulse applied through a lead 104 in the same manner as that set forth above in connection with the reset tube 41.

Each of the selector switches S2 to S5 has a contact 67 which is movable to engage one or another of ten fixed contacts above which appear numerals 0 to 9 indicating the count selected by the grounded contact 67. The contacts 67 are ganged together as indicated by a dashed line. With the contacts 67 in their illustrated closed position, a count of 5 is selected, no current is conducted by the B anodes of stages V3 to V5 and the A anode of V6, and the application of five input pulses to the stage V3 establishes current conduction in the A anodes of all the stages. From Fig. 3, or the above tabulation, it will be noted that at no other point in the operating cycle of the decade are the anodes B of the stages V5 and V6 simultaneously non-conductive.

These anode B voltages of the stages V5 and V6 which simultaneously attain their maximum values as indicated in Fig. 3 are applied to the grids 73 and 74 of a gate tube 75 which has a resistor 76 connected in its anode lead and causes a negative pulse indicated by the reference numeral 77 to be applied to a lead 78 when it conducts current.

This negative pulse 77 is applied through a capacitor 79 to the grid 80 of a reversing tube 81 which functions to produce an output pulse 82. This pulse 82 is applied to a grid 83 of a tube 84. Applied to another grid 85 of the tube 84 through a lead 86 is a voltage which has its maximum value in response to the selected count of a lower frequency decade which appears in Fig. 1*a*.

When the grids 83 and 85 of the tube 84 have their most positive voltages, the tube 84 draws current through a resistor 87 thereby producing a negative pulse 88 at the grid 89 of a tube 90 and decreasing the current of this tube so that a positive pulse 91 is produced at the grids 92 and 93 of a pair of parallel connected gate tubes 94 and 95.

The gate tubes 94 and 95 also have grids 96 and 97 to which the pulses 59 derived from the trigger circuit V2 are applied. As a result, there is produced at the anodes of the tubes 94 and 95 a negative pulse 98 which is applied to the grid 99 of a tube 100.

When the tube 100 draws current through a resistor 101, there is produced at its anodes a positive pulse 102 which is applied (1) through the lead 103 and the lead 38 to the reset tube 41 and (2) through the lead 103 and a lead 104 to the reset tubes 63 to 66.

Thus, each time the selected counts of the counter stage V2, the decade V3 to V6 and the low frequency decade (hereinafter described) are completed, there is applied a reset pulse by which the stages V2 to V6 are returned to the condition previously established by their respective selector switches as explained in connection with the stage V2.

The A and B anodes of the stage V6 are connected to the grids 105 and 106 of a pedestal shifting tube 107 which has its output lead 108 connected to the input of the decade V7 to V10 (see Fig. 4*a*). The tube 107 is connected to a selector switch S6 which functions to determine which side of the stage V6 is utilized to drive the decade V7 to V10. In the illustrated closed position of the switch S6, a more positive bias potential is applied to the grid 106 and the decade V7 to V10 is driven from the B anode of the stage V6. When the switch is closed in any of the positions to the left of that illustrated, the decade V7 to V10 is driven from the A anode of the stage V6. The selector switch S6 thus makes it possible to vary the phase relation between the pulses 82 and 109 (applied to the grids 83 and 85 of the combining tube 84) so that the pulse 82 is always superimposed on the pulse 109 to produce the maximum resultant of these two pulses.

The decade V7 to V10 is like the decade V3 to V6 with the exception that (1) single triodes are utilized and (2) and the reset pulse is applied directly through a lead 110 instead of through reset tubes.

The reset pulse of the lead 110 is derived from a resistor 111 which is connected in the cathode lead of a Thyratron 112. This Thyratron 112 has its grid 113 connected to the anodes of a duotriode 114 which functions to reverse the pulse 98 so that it is applied to the grid 113 in the form indicated by the reference numeral 116. When this positive pulse 116 appears at the grid 113, current is drawn through the resistor 111 and a similar pulse is applied through the reset lead of the decade V7 to V10. As a result the stages V7 to V10 are reset to current conductive conditions determined by the closed position of their respective selector switches S7 to S10 which have their movable contacts 117 ganged together and have fixed contacts like those of the selector switches S2 to S5.

A gate tube 118 and a reversing tube 119, like the tubes 75 and 81 previously described, are energized from the B anodes of the stages V9 and V10 to provide the reset pulse 109 which is applied through the lead 86 to the grid 85 of the tube 84. As explained above, this tube 84 functions to combine the pulse 109 from the decade V7 to V10 and the pulse 82 from the decade V3 to V6 so that the latter pulse is superimposed on the former and this two level voltage pulse is combined with the pulses 59 from the stage V2 to produce the pulses 102 and 116 which function to reset the counter.

What the invention provides is an improved variable frequency counter which (1) has count selector circuits such that all switching is done at ground or D. C. potential and (2) is so operated that voltages for resetting the counter are always derived from the same anodes of the same stages of each of the counter decades or sections.

What is claimed is:

1. The combination of a plurality of tandem-connected counter stages each including a pair of electron discharge devices which have operating potential applied to their anodes through separate impedance elements and have their grids each connected to the anode of the other so that current conduction is stable in one or the other of said anodes, means for applying input pulses to the first of said stages, a separate reset means connected to each of said stages, selector switches each having a grounded movable contact member and each operable through a different one of said reset means to select a desired count of said input pulses required to complete the operating cycle of said stages, and means operable through said reset means in response to the completion of said cycle for resetting said stages to said selected count.

2. The combination of a plurality of tandem-connected counter stages each including a pair of triodes which have operating potential applied to their anodes through separate impedance elements and have their grids each connected to the anode of the other so that current conduction is stable in one or the other of said anodes, means for applying input pulses to the first of said stages, a plurality of reset triodes arranged in pairs each of which has operating potential applied to its anodes through separate impedance elements and has its anodes connected to the grids of a different one of said stages, count selector means connected to bias one or the other grid of each of said pairs of reset triodes to a more positive potential, and a lead common to the grids of all of said reset triodes for applying a pulse whereby a count selected by said count selector means is established in said stages.

3. The combination of a plurality of tandem-connected counter stages each including a pair of triodes which have operating potential applied to their anodes through separate impedance elements and have their grids each connected to the anode of the other so that current conduction is stable in one or the other of said anodes, means for applying input pulses to the first of said stages, a plurality of reset triodes arranged in pairs each of which has operating potential applied to its anodes through separate impedance elements and has its anodes connected to the grids of a different one of said stages, a plurality of count selector switches each having a grounded movable contact and each having a plurality of fixed contacts connected to a different one of said reset triodes and so arranged that one or the other grid of each of said pair of reset triodes is biased to a more positive potential as each movable contact is moved to engage successive ones of its cooperating fixed contacts, and means for applying to the grids of said reset triodes a pulse by which the count selected by said switches is established in said stages.

4. The combination of four tandem-connected counter stages each including a pair of triodes which have operating potential applied to their anodes through separate impedance elements and have their grids each connected to the anode of the other so that current conduction is stable in one or the other of said anodes, means for applying input pulses to the first of said stages, feedback circuits connected from the third to the first and second of said stages so that the operating cycle of said stages is completed in response to ten of said input pulses, a separate reset means connected to each of said stages, selector switches each having a grounded movable contact member and each operable through a different one of said reset means to select from said ten counts any one count such that a desired count completes the operating cycle of said stages, and means including said reset means responsive to the completion of said cycle for resetting said stages to said selected count.

5. The combination of four tandem-connected counter stages each including a pair of triodes which have operating potential applied to their anodes through separate impedance elements and have their grids each connected to the anode of the other so that current conduction is stable in one or the other of said anodes, means for applying input pulses to the first of said stages, feedback circuits connected from the third to the first and second of said stages so that the operating cycle of said stages is completed in response to ten of said input pulses, a plurality of reset triodes arranged in pairs each of which has operating potential applied to its anodes through separate impedance elements and has its anodes connected to the grids of a different one of said stages, count selector means connected to bias one or the other grid of each of said pairs of reset triodes to a more positive potential, and a lead common to the grids of all of said reset triodes for applying a pulse whereby a count selected by said count selector means is established in said stages.

6. The combination of four tandem-connected counter stages each including a pair of triodes which have operating potential applied to their anodes through separate impedance elements and have their grids each connected to the anode of the other so that current conduction is stable in one or the other of said anodes, means for applying input pulses to the first of said stages, feedback circuits connected from the third to the first and second of said stages so that the operating cycle of said stages is completed in response to ten of said input pulses, a plurality of reset triodes arranged in pairs which each have operating potential applied to its anodes through separate impedance elements and each have its anodes connected to the grids of a different one of said stages, a plurality of count selector switches each having a grounded movable contact and each having a plurality of fixed contacts connected to a different one of said reset triodes and so arranged that one or the other grid of each of said pair of reset triodes is biased to a more positive potential as each movable contact is moved to engage successive ones of its cooperating fixed contacts, and means for applying to the grids of said reset triodes a pulse by which a desired count selected by said switches is established in said stages.

7. The combination of four tandem-connected counter stages each including a pair of triodes which have operating potential applied to their anodes through separate impedance elements and have their grids each connected to the anode of the other so that current conduction is stable in one or the other of said anodes, means for applying input pulses to the first of said stages, feedback circuits connected from the third to the first and second of said stages so that the operating cycle of said stages is completed in response to ten of said input pulses, a plurality of reset triodes arranged in pairs which each have operating potential applied to its anodes through separate impedance elements and each have its anode connected to the grids of a different one of said stages, a plurality of count selector switches each having a grounded movable contact and each having a plurality of fixed contacts connected to a different one of said reset triodes and so arranged that one or the other grid of each of said pair of reset triodes is biased to a more positive potential as each movable contact is moved to engage successive ones of its cooperating fixed contacts, means for deriving from corresponding anodes of the last two of said stages a potential which has its maximum value in response to completion of the operating cycle of said stages, and means including said reset triodes responsive to said maximum potential for applying to the grids of said reset triodes a pulse by which a desired count selected by said switches is established in said stages.

8. The combination of four tandem-connected stages each including a pair of electron discharge elements having operating potential applied to their anodes through separate impedance elements and having their grids each connected to the anode of the other so that current conduction is stable in one or the other of said anodes, means including resistors connected in pairs each pair of which is connected between the grids of a pair of said electron elements in each of said stages, a plurality of count selector switches each having a grounded movable contact and each having a plurality of fixed contacts connected to a different one of the resistor pairs, and means for applying a reset pulse through said resistor pairs to such of said grids as are selected by said selector switches.

OLIN L. MACSORLEY.

REFERENCES CITED

The following references are of record in the file of this patent:

UNITED STATES PATENTS

| Number | Name | Date |
|---|---|---|
| 2,410,156 | Flory | Oct. 29, 1946 |
| 2,422,698 | Miller | June 24, 1947 |

OTHER REFERENCES

Physical Review—vol. 57—1940 "A New Vacuum Tube Scaling Circuit . . . " by Lifschutz—pages 243, 244.

Electronic Industries—July 1945 "Preset Interval Timer," pages 97–99, 130, 134, 138, 142, 146.

RCA Review—vol. VII—No. 3, September 1946 "Electronic Counters, by Grosdoff—pages 438–447.

Electronics — February 1948; "Predetermined Counter for Process Control," by Blume—pages 88–93.